Dec. 16, 1952 — M. ZÖHRER — 2,621,698
PNEUMATIC TIRE TREAD

Filed July 18, 1947 — 3 Sheets-Sheet 1

INVENTOR:
Max Zöhrer
by Sommers & Young
Attorneys

Dec. 16, 1952 — M. ZÖHRER — 2,621,698
PNEUMATIC TIRE TREAD
Filed July 18, 1947 — 3 Sheets-Sheet 2
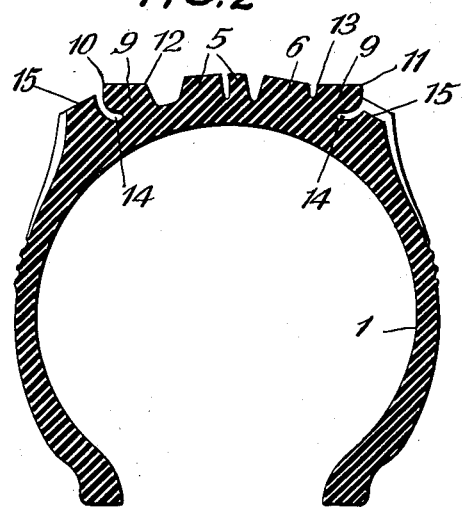
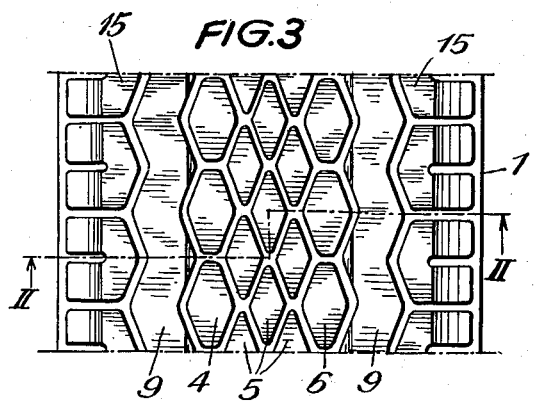
INVENTOR:
Max Zohrer
by Somders + Young
Attorneys Dec. 16, 1952  M. ZÖHRER  2,621,698
PNEUMATIC TIRE TREAD Filed July 18, 1947  3 Sheets-Sheet 3

INVENTOR
MAX ZOHRER,
BY Sommer & Young
ATTORNEYS

Patented Dec. 16, 1952

2,621,698

UNITED STATES PATENT OFFICE 2,621,698

PNEUMATIC TIRE TREAD

Max Zöhrer, Pfaffikon/Zurich, Switzerland, assignor to Aktiengesellschaft R. & E. Huber, Schweizerische Kabel-, Draht- und Gummiwerke, Pfaffikon/Zurich, Switzerland Application July 18, 1947, Serial No. 761,921
In Switzerland June 8, 1942

Section 1, Public Law 690, August 8, 1946
Patent expires June 8, 1962

4 Claims. (Cl. 152—209)

My present invention relates to improvements in pneumatic-tire treads for vehicles.

Various adaptations of the radial tire-tread cross-section have been proposed in prior art, in order to make as good a use as possible of the material required for the tire-tread structure. It is known, for example, to crown, that is, radially curve the tread on a predetermined radius of curvature, in order to obtain a surface pressure which is distributed as uniformly as possible over the entire tread width. The circumferential ribs of the central tire portion have been interrupted by gaps, in order to prevent an abrading of the greater circumference of such portion, thus attaining a balance for the greater circumference and a road contact over the entire tread width without abrading. The supporting ribs adjoining the central portion, which are subjected to the maximum surface pressure, thus have been radially sloped, which design, however, again causes an abrading action.

Further, tire treads are known which are not radially crowned, but possess a rectilinear tread, and the lateral faces of which are provided with recesses for the purpose of decreasing the great shoulder pressure brought about by the resilience of the outer profile portions attained by means of the said recesses. In such latter design, the surface pressure in the tire-tread center becomes too small, and the tire has to be made excessively wide so as to prevent an excessive lateral surface pressure.

In the tire tread according to my present invention, the regions on either side of the crowned tread center portion, in which regions the surface pressure under normal load and under normal tire pressure is a maximum, are adapted as continuous cylindrical supporting ribs.

An example of my present invention is shown in the accompanying drawing in which:

Figure 2 is a cross sectional view of the tire; and

Figure 3 is a plan view of a part of the tire tread.

Figure 1:
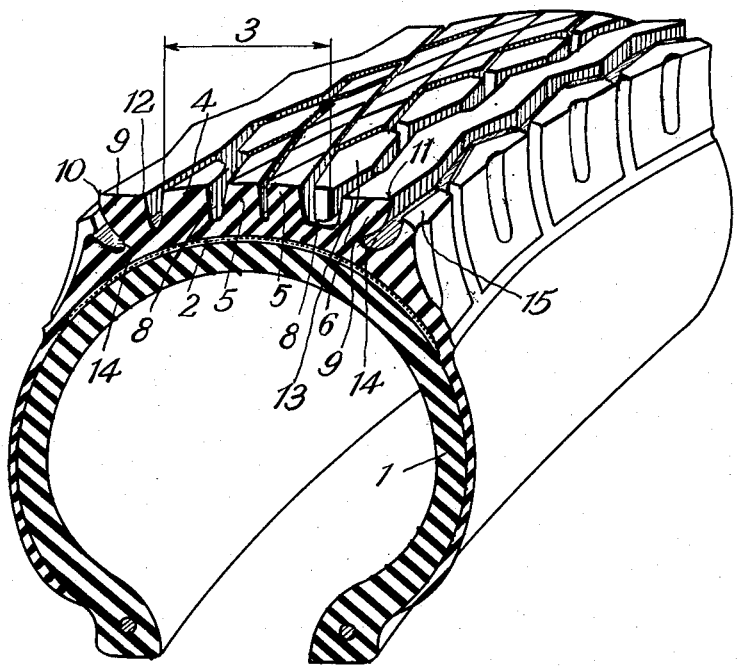
Figure 1 is a perspective view of a portion of a tire.

A pad 2 is mounted on the conventional tire structure 1, and the tread comprises a crowned central portion 3 which is formed of three circumferential ribs 4, 5 and 6. The latter are divided by grooves 8 which are not parallel to the circumferential direction. The regions on both sides of the crowned central portion 3 are adapted as continuous cylindrical supporting ribs 9. In order that the pressure on the outer edges 10 and 11 of ribs 9 be not higher than on the inner edges 12 and 13, the said ribs 9 have a cross-section which re-enters at 14. The said edges 10, 11 thus may yield. The shoulder portions 15 are set back with reference to the crowned central portion 3, so that the shoulder pressure, when riding in a curve, corresponds to that of a conventional crowned tire.

Figure 4:
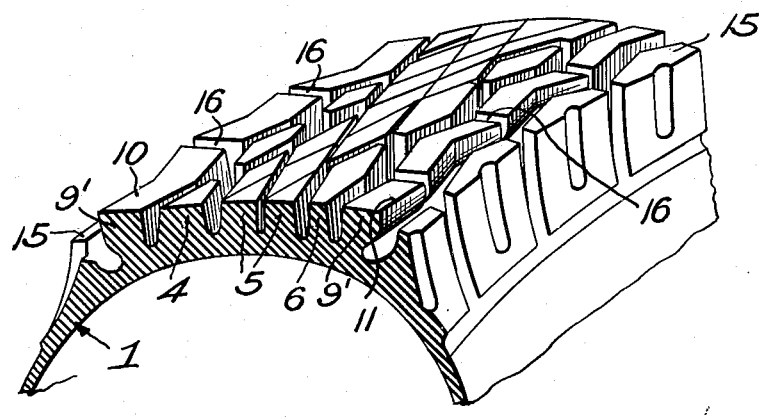
Fig. 4 is a perspective view of a portion of a modified embodiment.

In Fig. 4 a portion of a modified form of the tire according to the invention is shown in perspective. In this embodiment all features and parts are similar to the corresponding features and parts in the embodiment represented in Figs. 1–3 with the exception that the ribs 9' are shown as being non-continuous. These ribs 9' are interrupted by transverse grooves 16.

What I claim and desire to secure by Letters Patent is:

1. A pneumatic tire having a tread comprising a crowned central portion provided with diagonally extending grooves to define a plurality of circumferential non continuous ribs, a lateral circumferentially continuous rib portion on either side of said crowned central portion, said lateral rib portions each having a flat cylindrical face projecting beyond the curvature of the surface of the central portion, and a radially set back shoulder portion at the edge of the tread outside of said lateral continuous rib portion, the outer lateral face of said rib portion and the inner lateral face of the shoulder portion defining a continuous circumferential groove extending inwardly underneath said cylindrical face of the lateral rib portion to cause said rib portion to yield under load for bringing said flat cylindrical face substantially in alinement with the surface of the crowned central portion.

2. A pneumatic tire having a tread comprising a crowned central portion provided with grooves non parallel to the circumferential direction to define a plurality of circumferential non continuous ribs, a lateral circumferentially extending rib portion on either side of said crowned central portion, said lateral rib portions each having a flat cylindrical face projecting beyond the curvature of the surface of the central portion, and a radially set back shoulder portion at the edge of the tread outside of said lateral rib portion, the outer lateral face of said rib portion and the inner lateral face of the shoulder portion defining a continuous circumferential groove extending inwardly underneath said cylindrical face of the lateral rib portion to cause said rib portions to yield under load for bringing said flat cylindrical face substantially in alinement with the surface of the crowned central portion.

3. A pneumatic tire as defined in claim 2, in which said circumferentially extending rib portion is continuous.

4. A pneumatic tire as defined in claim 2, in which said circumferentially extending rib portion is non continuous.

MAX ZÖHRER.

REFERENCES CITED

The following references are of record in the file of this patent:

UNITED STATES PATENTS

| Number | Name | Date |
|---|---|---|
| 2,079,091 | Walsh | May 4, 1937 |
| 2,121,871 | Havens | June 28, 1938 |

FOREIGN PATENTS

| Number | Country | Date |
|---|---|---|
| 4,915 | Great Britain | 1909 |
| 28,517 | Great Britain | 1907 |
| 782,452 | France | June 5, 1935 |